United States Patent
Iwanowski

(10) Patent No.: US 9,347,436 B2
(45) Date of Patent: May 24, 2016

(54) METHOD AND SYSTEM FOR RENEWABLE ENERGY STORE IN TEMPERATURE-PRESSURE TANK OF ENERGY AND CONVERSION TO ELECTRICAL ENERGY

(76) Inventor: Dariusz Krzysztof Iwanowski, Szczecin (PL)

( * ) Notice: Subject to any disclaimer, the term of this patent is extended or adjusted under 35 U.S.C. 154(b) by 493 days.

(21) Appl. No.: 13/508,377

(22) PCT Filed: Nov. 18, 2009

(86) PCT No.: PCT/PL2009/050035
§ 371 (c)(1),
(2), (4) Date: May 7, 2012

(87) PCT Pub. No.: WO2011/062514
PCT Pub. Date: May 26, 2011

(65) Prior Publication Data
US 2012/0223533 A1    Sep. 6, 2012

(51) Int. Cl.
*H02P 9/00* (2006.01)
*F03G 6/00* (2006.01)
*F03B 13/00* (2006.01)
*F03D 9/02* (2006.01)
*F15B 1/02* (2006.01)

(52) U.S. Cl.
CPC ............. *F03G 6/001* (2013.01); *F03B 13/00* (2013.01); *F03D 9/02* (2013.01); *F15B 1/024* (2013.01); *Y02E 10/46* (2013.01); *Y02E 10/72* (2013.01); *Y02E 60/15* (2013.01)

(58) Field of Classification Search
USPC .......................... 290/44, 55, 2, 1 R, 40 A, 1 A
See application file for complete search history.

(56) References Cited

U.S. PATENT DOCUMENTS 3,678,284 A * 7/1972 Peters .......................... 290/1 R
4,182,960 A * 1/1980 Reuyl .......................... 290/1 R
(Continued)

FOREIGN PATENT DOCUMENTS

DE    195 49 455 A1    6/1997
EP    1 577 549 A1    9/2005
(Continued)

OTHER PUBLICATIONS

International Search Report, Jul. 27, 2010, from International Phase of the instant application.
(Continued)

*Primary Examiner* — Julio C. Gonzalez
(74) *Attorney, Agent, or Firm* — Kevin D. Jablonski; Lane Powell PC

(57) ABSTRACT

One exemplary method of renewable energy storage includes converting a part of the electrical energy, from a generator, in accordance with an electrical grid; and using a control system to steer another part of the electrical energy, from the generator, to a heating module, to heat a substance in a tank, thereby increasing a pressure in the tank. The method also includes using the control system to introduce a transmission agent into a heat exchanger in the tank, and using the heated transmission agent to drive a turbine. A sensor provides information, about a renewable energy stream, to the control system. The control system, responsive to the information, acts to control a valve coupled between the heat exchanger and the turbine, thereby enabling a constant transfer of energy to the electrical grid.

14 Claims, 1 Drawing Sheet

(56) References Cited

U.S. PATENT DOCUMENTS

| | | | |
|---|---|---|---|
| 4,206,608 A * | 6/1980 | Bell | 60/698 |
| 4,512,157 A * | 4/1985 | Weadock | 60/641.8 |
| 4,718,233 A * | 1/1988 | Barrett | 60/496 |
| 5,384,489 A | 1/1995 | Bellac | |
| 2005/0044853 A1* | 3/2005 | Yoshino | 60/641.8 |
| 2007/0019708 A1* | 1/2007 | Shiflett et al. | 374/181 |
| 2007/0220889 A1* | 9/2007 | Nayef et al. | 60/652 |
| 2008/0252078 A1* | 10/2008 | Myers et al. | 290/52 |

FOREIGN PATENT DOCUMENTS

| | | | |
|---|---|---|---|
| EP | 1577549 A1 * | 9/2005 | |
| WO | WO 2006/007733 A1 | 1/2006 | |
| WO | WO 2006/032685 A1 | 3/2006 | |

OTHER PUBLICATIONS

Written Opinion of the International Search Authority, May 18, 2012, from International Phase of the instant application.

Preliminary Report on Patentability Chapter II, Feb. 22, 2013, from International Phase of the instant application.

* cited by examiner

METHOD AND SYSTEM FOR RENEWABLE ENERGY STORE IN TEMPERATURE-PRESSURE TANK OF ENERGY AND CONVERSION TO ELECTRICAL ENERGY

BACKGROUND

The present disclosure is directed to a method and system for renewable energy to be stored in temperature-pressure tank for eventual conversion to electrical energy making possible the conversion of renewable energy into a variable stream. Such a system and method is suitable especially of wind, tide and the sun, to realize a constant stream of electrical energy.

One conventional solution is the described in Japanese Patent No. JP2240401 (A) that shows method of storing energy in substance under pressure in pressure accumulator.

Another conventional solution is described in French Patent No. FR2891095 (A1) that shows method of storing energy in a heated substance in a tank with water heated by sun panels.

Yet another solution is described in Japanese Patent No. JP57146004 (A) that shows method of storing energy in a heated substance in a heat accumulator.

DETAILED DESCRIPTION

Figure 1:
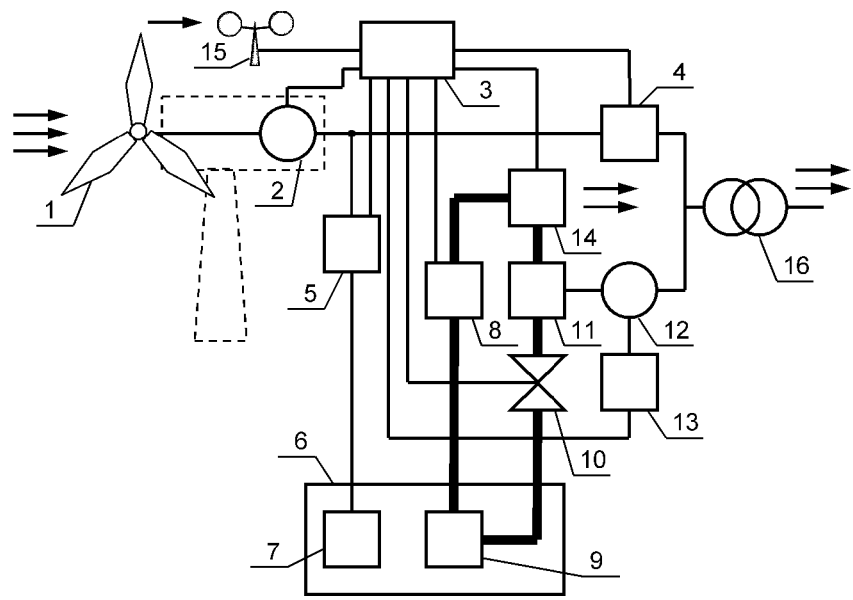
FIG. 1 shows a system for storing renewable energy especially from wind and tides.

The inventive subject matter disclosed herein is directed to a method and system for storing renewable energy in a temperature-pressure tank and converting the stored energy into electrical energy. The system and method takes advantage of accumulation of energy in a substance in tank that is subject to high pressure and temperature.

The system for storing renewable energy store in temperature-pressure tank for conversion to electrical energy may be characterized by storing electrical energy produced from renewable energy by a main generator (or generators). This energy is stored in temperature-pressure tank without conversion to the proper parameters for the electrical grid. Only part of electrical energy is converted by a converter to the proper parameters for the electrical grid. Heat accumulated in the tank is transferred to a transmission agent, which may be a gas under pressure that is then projected to a turbine, which drives an additional electrical generator. While renewable energy stream is present, the simultaneous using of a converter and the additional electrical generator provides for generating higher output power from the system. In the case where the system must be connected to the electrical grid through a transformer, it is possible to use a transformer with lower power requirements than the power requirements of the main generator. Moreover this transformer is much better as it may be continuously used during operation. Use of a renewable energy stream sensor provides feedback information to the control system about the actual stream of energy. Based on this feedback information, the control system controls the converter, modules in the transmission agent circuit, and a control module of the additional electrical generator. Additionally the control system can use energy accumulated in the rotating mass of the turbine rotor. It provides for receiving a constant stream of electrical energy transferred to the electrical grid. The system produces additional stream of heat, which can be used for other purposes (e.g.: buildings heating). The system can also work as the stable electrical energy source without connection to the grid.

In the case when the system uses energy of the sun, this sun energy can be used directly for heating a substance in temperature-pressure tank without any additional conversion to electrical energy. Part of the sun energy is used for direct heating of the transmission agent which is the gas under pressure that is projected to the turbine for driving the electrical generator. The generator is fed by energy from the tank or part of the sun energy that has lower power than power of the sun energy stream. Moreover, the generator is continuously used during operation. While the sun energy stream is present, the simultaneous using of the sun energy and energy stored in tank leads to generating higher output power by the system.

This solution eliminates the negative influence of changes in various renewable energy streams on the generation of an electrical energy stream, which is fed to the electrical grid. Thanks to this solution, ecological, clear, reliable and stable electrical energy source is achievable which fully enables replacement of conventional generation sources.

Figure 2:
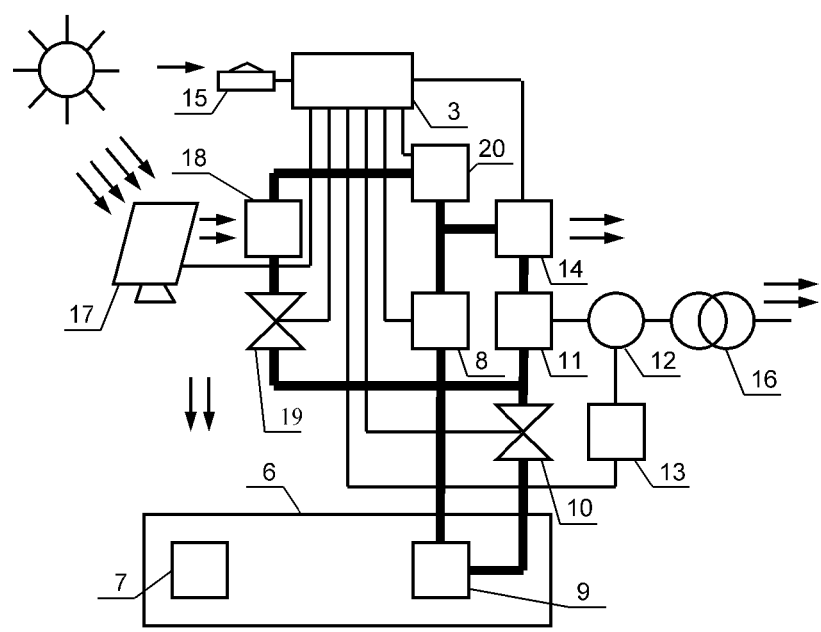
FIG. 2 shows a system for storing renewable energy especially from the sun.

The subject matter disclosed herein is shown in examples of realization where FIG. 1 shows a system for storing renewable energy especially from wind and tides and FIG. 2 shows a system for storing renewable energy especially from the sun.

In the example embodiment of FIG. 1 wind or tides turbine rotor 1, is driven by variable energy stream of wind or water. Rotor 1 is converting this energy to mechanical energy driving generator 2, which converts it to electrical energy. A first portion of the electrical energy is directed by control system 3 to be converted by converter 4 to electrical energy with proper parameters for the electrical grid. A second portion of the electrical energy is directed by the control system 3 to be transferred through a regulation-switching module 5 and to a heating module 7 that is disposed inside of a temperature-pressure tank 6. The heating module 7 is converting this energy to heat the substance in tank.

During the accumulation of heat energy in the tank, temperature and pressure are increasing. As directed by the control system 3, a pressing-valve module 8 is coupled to the tank 6 and provides for a transmission agent, such as a gas from the tank 6, to be vented though two paths from an internal heat exchanger 6 located in the temperature-pressure tank 6. The transmission agent, after being heated in the heat exchanger 9, the gas with pressure by valve 10 controlled by control system 3 is provided to the turbine 11, which drives an additional electrical generator 12. Proper parameters of the produced energy for the electrical grid are directed by control system 3 with a control module 13. The transmission agent, after passage through turbine 11, experiences a decreasing pressure and is cooled in an external heat exchanger 14, where additional stream of heat is received through the pressing-valve module 8.

A renewable energy stream sensor 15 provides feedback information to the control system 3 about actual power of the wind or tides stream. The feedback information allows for a fast reaction of the system to a change of the renewable energy stream and energy produced by the generator 2. Proper control of the converter 4, the pressing-valve module 8, the valve 10 and the external heat exchanger 14 in transmission agent circuit is achievable. This gives rise to the using the control module 13 of generator 12, and using energy accumulated in rotating mass of turbine rotor 1 to then generate a constant stream of electrical energy to be introduced to the grid. If it is needed, while the energy stream of wind or tides is present, it is possible the simultaneous work of the generator 2 with the converter 4 and the generator 12 provides two times more electrical energy than through electrical energy generation from wind or tides alone. If conversion of voltage produced by the converter 4 and/or the generator 12 to voltage of electrical grid is needed, a transformer 16 can be used. Moreover, the transformer 16 nominal power can be lower than power of the generator 2. The system directed by control system 3 can work as the stable electrical energy source without connection to the electrical grid. Temperature-pressure tank 6 can be artificial or natural such that it has a lower influence on the landscape.

Electrical energy produced by the generators driven by renewable energy of wind or tide can be converted in majority into heat accumulated in temperature-pressure tank without additional conversion while reducing losses. Only part of electrical energy is converted by the converter 4 to the proper parameters for the electrical grid provides savings because a smaller power converter 4 is needed. The generator 12 driven by energy accumulated in tank 6 has power which is only part of power of the generator 2 (generators) driven by energy of wind or tide. Moreover, this generator 12 is continuously used during operation. The simultaneous using of the converter 4 and generator 12 driven by tank 6 energy gives provides for higher output power of the system what increases energetic safety of the electrical grid. In the case when the system must be connected to the electrical grid through the transformer 16, it is possible to save money because of the use the transformer 16 with lower nominal power than power of main generator 2 (generators). Moreover, the transformer 16 is more efficiently and continuously used during operation.

In the example realization according to FIG. 2, solar energy of the sun is conducted on mirror 17 and heater 18. The mirror 17 controlled by the control system 3 is reflecting part of the sun energy in direction of heating module 7 located in temperature-pressure tank 6, which heating module 7 is converting energy to heat stored in the substance in the tank 6. During accumulation, temperature and pressure is increasing in the tank 6. A pressing-valve module 20, controlled by the control system 3, introduces a transmission agent to heater 18. The transmission agent, after being heated in heater 18, gas under pressure is supplied to the turbine 11 through valve 19 controlled by the control system 3. A second pressing-valve module 8, controlled by the control system 3, introduces the transmission agent to a heat exchanger 9 located in the temperature-pressure tank 6. The transmission agent, after being heated in the heat exchanger 9, gas under pressure through a valve 10 controlled by the control system 3, is also provided to the turbine 11, which drives the electrical generator 12.

Parameters of produced energy are controlled by the control system 3 with control module 13. The transmission agent, after passage through the turbine 11 with pressure decreasing, is cooled in a second heat exchanger 14, where additional stream of heat is received through the pressing-valve module 8. A renewable energy stream sensor 15 provides feedback information about actual power the sun energy stream for the control system 3. The feedback information provides for fast reaction of the system to a change of the sun energy stream and any resulting change of energy received by the mirror 17 on heating module 7 and heater 18.

Proper control between the pressing-valve modules 8 and 20, the valves 10 and 19 and the heat exchanger 14 in transmission agent circuit and the control module 13 for generator 12 provides for a constant stream of electrical energy to be introduced to the grid. If it is needed, while the energy stream of the sun is present, it is possible that the simultaneous work of heater 18 and the heat exchange system provides for two times bigger the stream of the transmission agent which drives the turbine 11 and the generator 12 which results in two times bigger electrical energy stream. If conversion of voltage produced by the generator 12 to voltage of electrical grid is needed, a transformer 16 can be used. Moreover, the transformer 16 nominal power can be lower than the power collected and transmitted by the mirror 17 and the heater 18. The system controlled by the control system 3 can work as a stable electrical energy source without connection to the grid. Thus, in this embodiment, energy of the sun can be used directly for heating a substance in the temperature-pressure tank 6 without any additional conversion to electrical energy which reduces energy losses. Only part of the sun energy is used for direct heating of the transmission agent and a smaller and cheaper heater 7 may be used. The generator 12, fed by energy from the tank 6 and/or part of the sun energy has lower power than the power of the sun energy stream and, because of that, it is cheaper. Moreover, the generator 12 is continuously used during operation. While the sun energy stream is present, the simultaneous using of the sun energy and energy stored in the tank 6 gives rise to the possibility of receiving higher output power from the system and increasing energetic safety of the electrical grid. In the case when the system must be connected to the electrical grid through the transformer 16, it is possible to save money because of the use of a transformer 16 with lower nominal power than power collected the sun energy stream. Moreover, the transformer 16 is continuously used during operation.

The invention claimed is:

1. A system for manipulating energy, comprising:
an energy capture device configured to capture energy from a renewable energy source and transform the captured energy into first stream of electrical energy;
a storage tank having a substance therein capable of being heated and cooled;
a control system coupled to an energy converter and configured to direct a first portion of the first stream of electrical energy to a first node and configured to direct a second portion of the first stream of electrical energy to the storage tank to heat the substance;
a heat exchanger system coupled to the storage tank and configured to generate second stream of electrical energy to the first node;
a renewable energy source sensor coupled to the control system and configured to generate an indication of power of the renewable energy source;
a first generator generating the first stream of electrical energy coupled to the energy capture device; and
a second generator generating the second stream of electrical energy coupled to a turbine driven by the heat exchanger system;
wherein the control system directs the first portion and the second portion of the first stream of electrical energy and controls generation of the second stream of electrical energy in response to the renewable energy source sensor;
wherein the storage tank further comprises:
a heater disposed inside the storage tank and configured to transform the second portion of the first stream of electrical energy into heat; and
a heat exchanger disposed inside the storage tank and configured to direct a transmission agent from inside the storage tank to the heat exchanger system.

2. The system of claim 1, wherein the energy converter comprises a wind rotor and the renewable energy source comprises wind power.

3. The system of claim 1, wherein the energy converter comprises a water rotor and the renewable energy source comprises water power.

4. The system of claim 1, wherein the energy converter comprises a solar mirror and the renewable energy source comprises sun power.

5. The system of claim 1, wherein the control system is further configured to:
increase the first portion of the first stream of electrical energy and decrease the second stream of electrical energy in response to the renewable energy source sensor determining that power from the renewable energy source is increasing; and
decrease the first portion of the first stream of electrical energy and increase the second stream of electrical energy in response to the renewable energy source sensor determining that power from the renewable energy source is decreasing.

6. The system of claim 1, wherein the control system is further configured to manipulate the first and the second stream of electrical energy to be in condition for constant/continuous supplying an electrical grid/customers.

7. The system of claim 1, further comprising a transformer coupled to the first node.

8. The system of claim 1, wherein the first node comprises an electrical grid.

9. A method for manipulating energy, comprising:
capturing energy from a renewable energy source at an energy capture device and transforming the captured energy into a first stream of electrical energy generated by a first generator;
directing a first portion of the first stream of electrical energy to a first node; directing a second portion of the first stream of electrical energy to a heater disposed inside a storage tank to heat a substance in the storage tank;
heating the heater disposed inside the storage tank to transform the second portion of electrical energy into heat;
venting a heat exchanger disposed inside the storage tank to direct a transmission agent from inside the storage tank to a heat exchanger system;
generating a second stream of electrical energy through the heat exchanger system coupled to the storage tank, the second stream of electrical energy being generated at the first node via a turbine driving a second generator;
sensing an indication of power of the renewable energy source; and
changing the first portion and the second portion of the first stream of electrical energy and generation of the second stream of electrical energy in response to the sensing of power of a renewable energy source sensor.

10. The method of claim 9, wherein capturing energy from a renewable energy source comprises driving a wind rotor with wind power.

11. The method of claim 9, wherein capturing energy from a renewable energy source comprises driving a water rotor with water power.

12. The method of claim 9, wherein capturing energy from a renewable energy source comprises heating a mirror with sun power.

13. The method of claim 9, further comprising:
increasing the first portion of the first stream of electrical energy and decreasing the second stream of electrical energy in response to the renewable energy source sensor determining that power from the renewable energy source is increasing; and
decreasing the first portion of the first stream of electrical energy and increasing the second stream of electrical energy in response to the renewable energy source sensor determining that power from the renewable energy source is decreasing.

14. The method of claim 9, further comprising manipulating the first and the second stream of electrical energy to be in condition for constant/continuous supplying an electrical grid/customers.

* * * * *